(12) United States Patent (10) Patent No.: US 7,664,136 B2
Toebes et al. (45) Date of Patent: Feb. 16, 2010

(54) INLINE POWER FOR MULTIPLE DEVICES IN A WIRED DATA TELECOMMUNICATIONS NETWORK

(75) Inventors: John Albert Toebes, Cary, NC (US); Ping Li, Fremont, CA (US); Jack C. Cham, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 11/144,094

(22) Filed: Jun. 2, 2005

(65) Prior Publication Data

US 2006/0273661 A1 Dec. 7, 2006

(51) Int. Cl.
*H04L 12/66* (2006.01)
(52) U.S. Cl. ...................................... 370/463
(58) Field of Classification Search ................. 370/463; 713/310
See application file for complete search history.

(56) References Cited

U.S. PATENT DOCUMENTS

| | | | |
|---|---|---|---|
| 4,835,737 A | 5/1989 | Herrig et al. |
| 5,122,691 A | 6/1992 | Balakrishnan |
| 5,148,144 A | 9/1992 | Sutterlin et al. |
| 5,237,511 A | 8/1993 | Caird et al. |
| 5,268,592 A | 12/1993 | Bellamy et al. |
| 5,289,359 A | 2/1994 | Ziermann |
| 5,386,567 A | 1/1995 | Lien et al. |
| 5,406,260 A | 4/1995 | Cummings et al. |
| 5,461,671 A | 10/1995 | Sakuragi et al. |
| 5,483,574 A | 1/1996 | Yuyama |
| 5,491,804 A | 2/1996 | Heath et al. |
| 5,531,612 A | 7/1996 | Goodall et al. |
| 5,608,792 A | 3/1997 | Laidler |
| 5,613,130 A | 3/1997 | Teng et al. |
| 5,639,267 A | 6/1997 | Loudermilk |
| 5,726,506 A | 3/1998 | Wood |
| 5,742,513 A | 4/1998 | Bouhenguel et al. |
| 5,758,102 A | 5/1998 | Carey et al. |
| 5,775,946 A | 7/1998 | Briones |
| 5,790,391 A | 8/1998 | Stich et al. |
| 5,790,873 A | 8/1998 | Popper et al. |

(Continued)

FOREIGN PATENT DOCUMENTS

WO WO96/23377 8/1996

OTHER PUBLICATIONS

International Search Report for International Application No. PCT/US2005/036392, date of mailing Mar. 10, 2006.

(Continued)

*Primary Examiner*—Derrick W Ferris
*Assistant Examiner*—Jason Levelle
(74) *Attorney, Agent, or Firm*—BainwoodHuang

(57) ABSTRACT

A power sourcing equipment-powered device (PSE-PD) combination unit requests inline power from a connected PSE or other PSE-PD combination unit by having the PD portion of the PD-PSE combination unit adapt its electrical characteristics, if necessary, to obtain the maximum power available. The PD-PSE combination device keeps track of available power less power consumed locally with a summation unit. A PSE manager unit grants PD power requests from downstream devices based upon the available power left (e.g., original PSE power less losses less local consumption).

20 Claims, 6 Drawing Sheets

U.S. PATENT DOCUMENTS

| | | | |
|---|---|---|---|
| 5,793,987 | A | 8/1998 | Quackenbush et al. |
| 5,796,185 | A | 8/1998 | Takata et al. |
| 5,808,660 | A | 9/1998 | Sekine et al. |
| 5,809,256 | A | 9/1998 | Najemy |
| 5,834,925 | A | 11/1998 | Chesavage |
| 5,884,086 | A | 3/1999 | Amoni et al. |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,310,781 | B1 | 10/2001 | Karam |
| 6,396,392 | B1 | 5/2002 | Abraham |
| 6,448,899 | B1 | 9/2002 | Thompson |
| 6,496,105 | B2 | 12/2002 | Fisher et al. |
| 6,541,878 | B1 | 4/2003 | Diab |
| 6,643,566 | B1 * | 11/2003 | Lehr et al. .................. 700/286 |
| 6,701,443 | B1 | 3/2004 | Bell |
| 6,762,675 | B1 | 7/2004 | Cafiero et al. |
| 6,764,343 | B2 | 7/2004 | Ferentz |
| 6,804,351 | B1 | 10/2004 | Karam |
| 6,958,699 | B1 | 10/2005 | Karam |
| 6,986,071 | B2 | 1/2006 | Darshan et al. |
| 7,023,809 | B1 * | 4/2006 | Rubinstein et al. .......... 370/241 |
| 7,089,126 | B2 | 8/2006 | Muir |
| 7,145,439 | B2 | 12/2006 | Darshan et al. |
| 7,154,381 | B2 * | 12/2006 | Lang et al. ............. 340/310.11 |
| 7,159,129 | B2 | 1/2007 | Pincu et al. |
| 7,162,377 | B2 | 1/2007 | Amrod et al. |
| 7,257,724 | B2 * | 8/2007 | Lehr et al. ................... 713/323 |
| 2004/0049321 | A1 | 3/2004 | Lehr et al. |
| 2004/0073597 | A1 | 4/2004 | Caveney et al. |
| 2004/0146061 | A1 | 7/2004 | Bisceglia et al. |
| 2004/0260794 | A1 | 12/2004 | Ferentz et al. |
| 2005/0132240 | A1 | 6/2005 | Stineman, Jr. et al. |
| 2005/0197094 | A1 | 9/2005 | Darshan et al. |
| 2005/0257262 | A1 | 11/2005 | Matityahu et al. |
| 2006/0212724 | A1 * | 9/2006 | Dwelley et al. ............. 713/300 |

OTHER PUBLICATIONS

"3Com User Guide," 3Com Network Jack, Model NJ200, Version 1.0, 3Com, Sep. 2002.

International Search Report for International Application No. PCT/US2005/036329, date of mailing Sep. 4, 2006.

International Preliminary Report on Patentability Application No. PCT/US2005/036328, date of mailing May 18, 2007.

Lynn, K., "Universal Serial Bus (USB) Power Management," Wescon Conference, IEEE, Sep. 1998, pp. 194-201.

"IEEE Standard 802.3af™", IEEE Standard for Information Technology-Telecommunications and Information Exchange Between Systems-Local and Metropolitan Area Networks-Specific Requirement, IEEE The Institute of Electrical and Electronics Engineering, Inc., Jun. 18, 2003.

"3Com® NJ100 Network Jack Power", printed from http://www.poweroverethernet.com/manual/content/view/full/776/, 3Com, Tuesday, Mar. 18, 2003.

3Com User Guide-3Com IntelliJack, Model NJ220, Version 1.0, 3Com, Nov. 2003.

* cited by examiner

INLINE POWER FOR MULTIPLE DEVICES IN A WIRED DATA TELECOMMUNICATIONS NETWORK

STATEMENT OF RELATED CASES

This patent may be considered to be related to commonly owned U.S. patent application Ser. No. 10/961,864 filed on Oct. 7, 2004 and entitled "Bidirectional Inline Power Port" in the names of inventors Daniel Biederman, Kenneth Coley and Frederick R. Schindler.

This patent may also be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may also be considered to be related to commonly owned U.S. patent application Ser. No. 10/961,904 filed on Oct. 7, 2004 and entitled "Inline Power—Based Common Mode Communications in a Wired Data Telecommunications Network" in the names of inventors Roger A. Karam, Frederick R. Schindler and Wael William Diab.

This patent may be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero. That application is hereby incorporated herein by reference as if set forth fully herein.

This patent may also be considered to be related to commonly owned U.S. patent application Ser. No. 10/982,383 filed on Nov. 5, 2004 and entitled "Power Management for Serial-Powered Device Connections" in the name of inventor Roger A. Karam.

This patent may also be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may also be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero.

This patent may also be considered to be related to commonly owned U.S. patent application Ser. No. 10/981,203 filed on Nov. 3, 2004 and entitled "Powered Device Classification In A Wired Data Telecommunications Network" in the name of inventors Roger A. Karam and John F. Wakerly.

This patent may also be considered to be related to commonly owned U.S. patent application Ser. No. 10/981,202 filed on Nov. 3, 2004 and entitled "Current Imbalance Compensation for Magnetics in a Wired Data Telecommunications Network" in the names of inventors Roger A. Karam and John F. Wakerly.

This patent may also be considered to be related to commonly owned U.S. patent application Ser. No. 10/845,021 filed May 13, 2004 and entitled "Improved Power Delivery over Ethernet Cable" in the names of inventors Wael William Diab and Frederick R. Schindler.

This patent may also be considered to be related to commonly owned U.S. Pat. No. 6,541,878 entitled "Integrated RJ-45 Magnetics with Phantom Power Provision" in the name of inventor Wael William Diab.

This patent may also be considered to be related to commonly owned U.S. patent application Ser. No. 10/850,205 filed May 20, 2004 and entitled "Methods and Apparatus for Provisioning Phantom Power to Remote Devices" in the name of inventors Wael William Diab and Frederick R. Schindler.

This patent may also be considered to be related to co-pending commonly owned U.S. patent application Ser. No. 10/033,808 filed Dec. 18, 2001 and entitled "Signal Disruption Detection in Powered Networking Systems" in the name of inventor Roger A. Karam.

FIELD OF THE INVENTION

The present invention relates generally to networking equipment which is powered by and/or powers other networking equipment over wired data telecommunications network connections.

BACKGROUND OF THE INVENTION

Inline power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission of Ethernet packets with the transmission of DC-based power over the same set of wires in a single Ethernet cable. It is contemplated that Inline power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard. Two conductor wiring such as shielded or unshielded twisted pair wiring (or coaxial cable or other conventional network cabling) may be used so each transmitter and receiver has a pair of conductors associated with it.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether inline power is delivered over Pair 1-2, Pair 3-4 or Pair 1-2+Pair 3-4. In the circuit shown in FIG. 1E a PD associated with Pair 1-2 is powered by inline power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline power is also available through techniques that are non-IEEE 802.3 standard compliant as is well known to those of ordinary skill in the art.

In order to provide regular inline power to a PD from a PSE it is a general requirement that two processes first be accomplished. First, a "discovery" process must be accomplished to verify that the candidate PD is, in fact, adapted to receive inline power. Second, a "classification" process must be accomplished to determine an amount of inline power to allocate to the PD, the PSE having a finite amount of inline power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some inline power (not "regular" inline power, i.e., reduced voltage and limited current) as the discovery signal to measure resistance across the two pairs of conductors to determine if the 25,000 ohm identity network is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular inline power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
| --- | --- | --- |
| 0 | 0–5 | 15.4 |
| 1 | 8–13 | 4.0 |
| 2 | 16–21 | 7.0 |
| 3 | 25–31 | 15.4 |
| 4 | 35–45 | 15.4 |

The discovery process is therefore used in order to avoid providing inline power (at full voltage of −48VDC) to so-called "legacy" devices which are not particularly adapted to receive or utilize inline power.

The classification process is therefore used in order to manage inline power resources so that available power resources can be efficiently allocated and utilized.

IEEE 802.3af power over Ethernet technology is focused on providing power from a single PSE to a single PD, the typical situation where a data port on an Ethernet switch powers an attached PD such as a VOIP telephone. In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

A power sourcing equipment-powered device (PSE-PD) combination unit requests inline power from a connected PSE or other PSE-PD combination unit by having the PD portion of the PD-PSE combination unit adapt its electrical characteristics, if necessary, to obtain the maximum power available. The PD-PSE combination device keeps track of available power less power consumed locally with a summation unit. A PSE manager unit grants PD power requests from downstream devices based upon the available power left (e.g., original PSE power less losses less local consumption).

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention described in the following detailed description are directed at methods and apparatuses for providing inline power to multiple daisy chained devices in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Note that since fixed voltages are generally used for inline power provision in data communications networks implementing inline power, the terms "power" and "current" are largely interchangeable as used herein. While we often refer to "power" being allocated or requested, more technically it is usually the electrical current magnitude which is being allocated and requested, thus, the two terms should be treated as equivalents for the purposes of this disclosure.

Data communications networks have become an integral part of everyday life for many people. As more and more applications for data networks become available, more and more devices are becoming available which not only require a data connection but also require a power connection. Integrated circuitry generally makes power demands of such circuitry relatively small, however, voice over internet protocol (VOIP) telephones, networked cameras, networked sensors, wireless access points, and the like all often require at least a few watts of power and can benefit from daisy-chained connectivity without the requirement for a cable run back to a server or switch at every node.

Figure 1A:
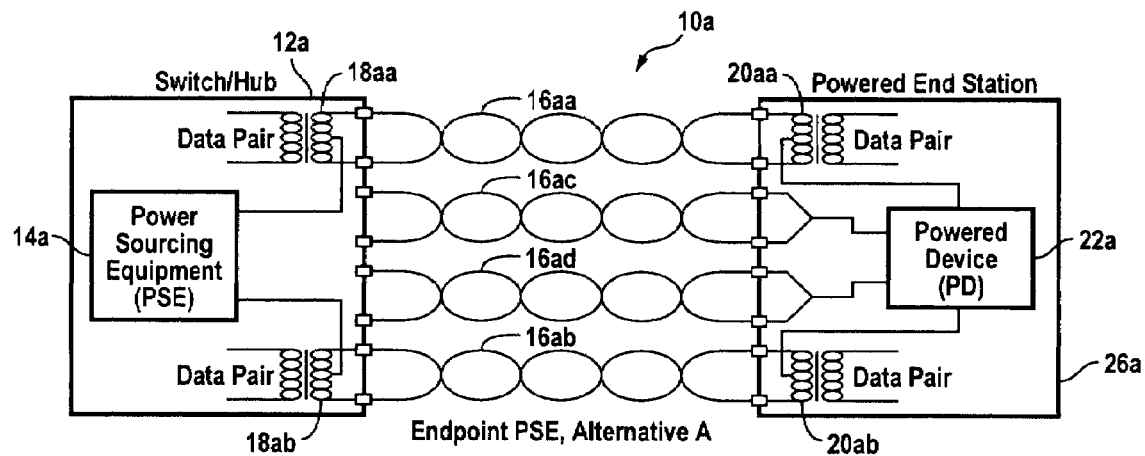
FIGS. 1A, 1B, 1C, 1D and 1E are electrical schematic diagrams of portions of data telecommunications networks in accordance with the prior art.
Figure 1B:
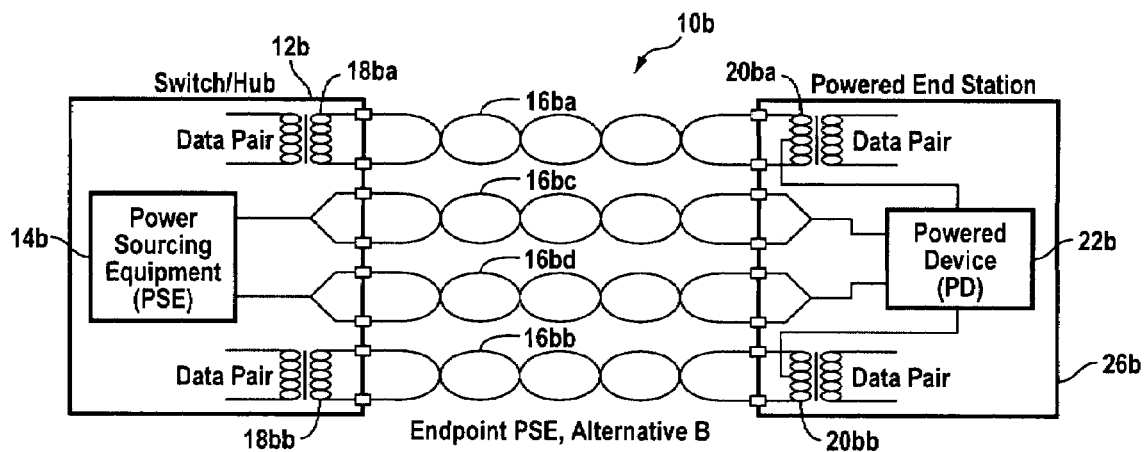
Figure 1C:
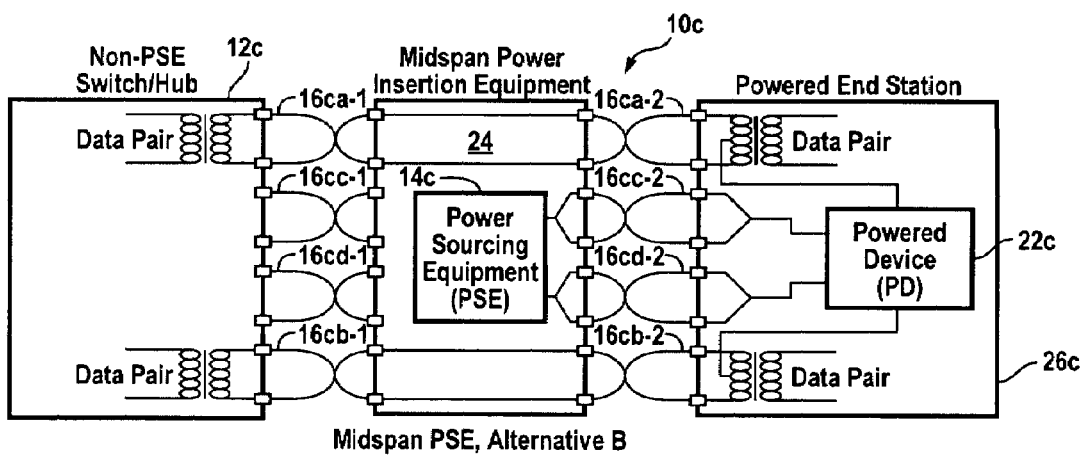
Figure 1D:
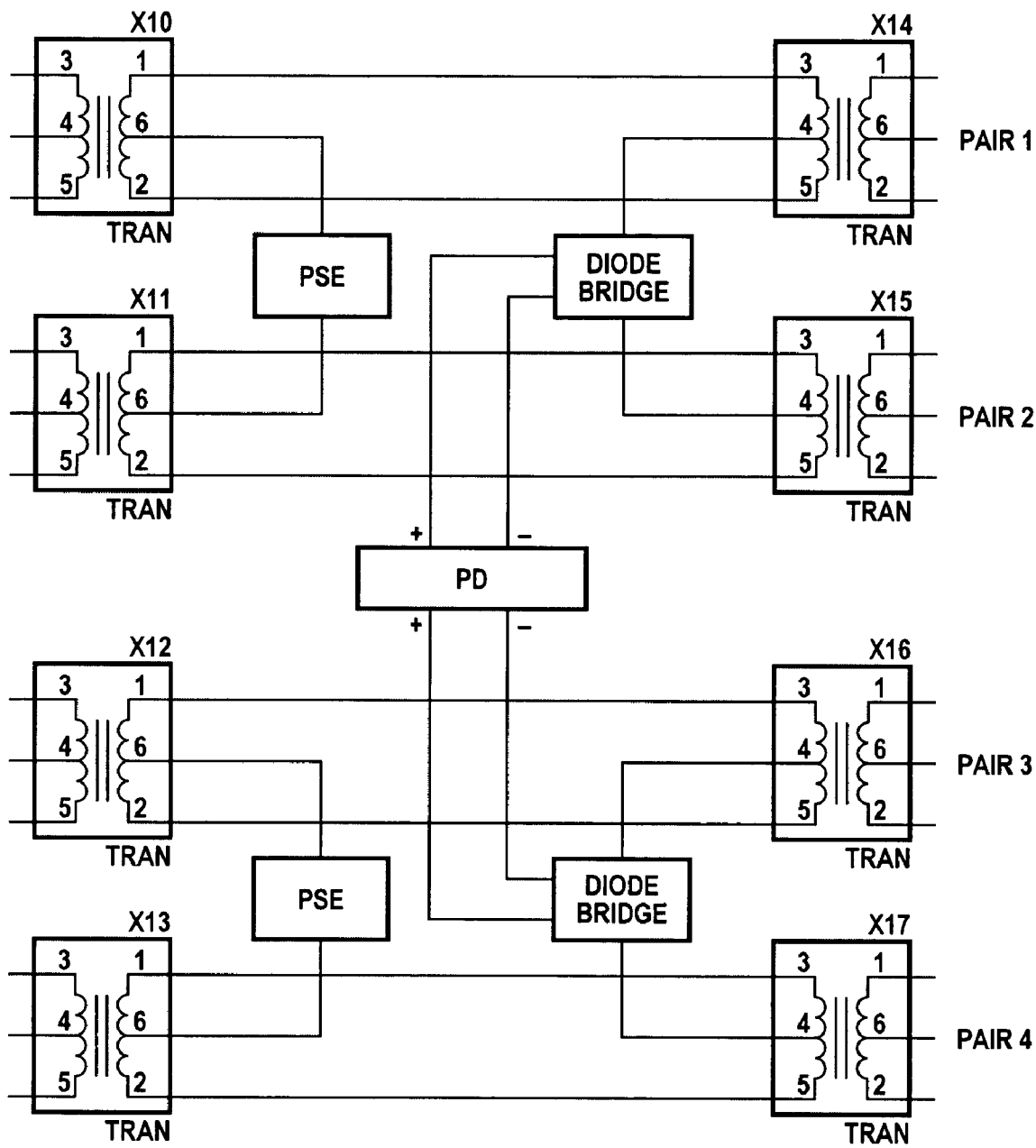
Figure 1E:
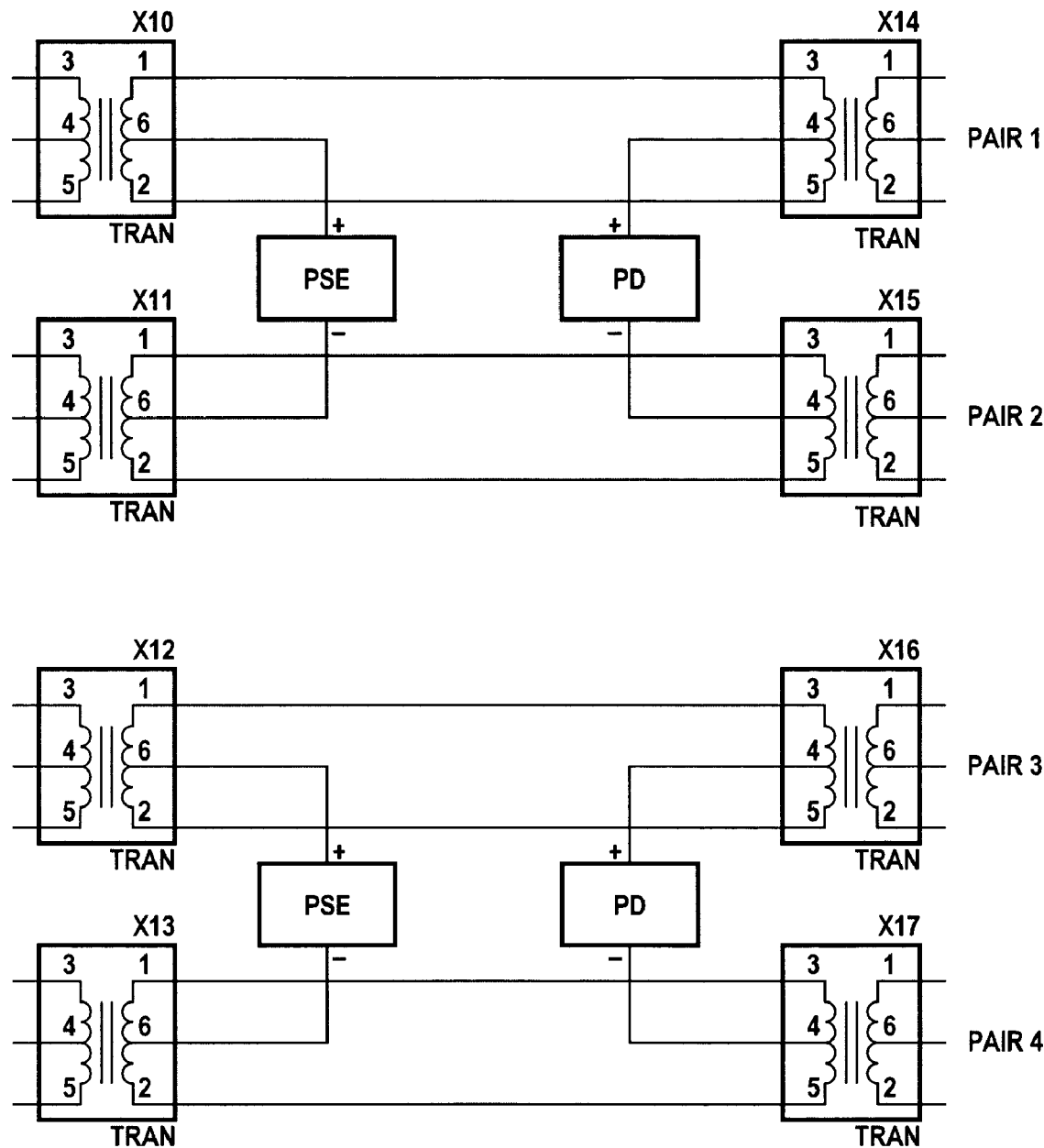
Figure 2:
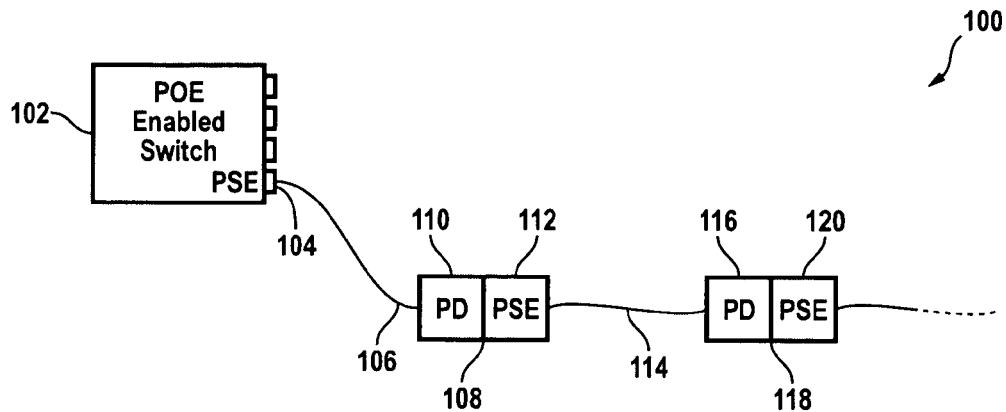
FIG. 2 is a system block diagram of a network comprising a plurality of PSE-PD combination units arranged in a daisy chain configuration in accordance with an embodiment of the present invention.

Turning now to FIG. 2, a basic configuration of a network segment in accordance with an embodiment of the present invention is illustrated. In FIG. 2, network segment 100 comprises, for example, a POE enabled switch 102, at least one port of which 104 is configured as power sourcing equipment (PSE). Such ports (and all ports discussed herein) may be implemented with conventional wired network connectors such as female RG-45 connectors or other suitable connectors as are well known to those of ordinary skill in the art. A first cable 106 couples PSE 104 with first PSE-PD combination unit 108. First PSE-PD combination unit 108 includes a pair of ports: a first port 110 configured as a powered device (PD) and a second port 112 configured as power sourcing equipment (PSE). The design and operation of first PSE-PD combination unit 108 is described in detail below. A second cable 114 couples second port 112 with first port 116 of second PSE-PD combination unit 118. A second port 120 of second PSE-PD combination unit 118 is configured as PSE and is available for coupling to additional devices, in the same manner as discussed above.

Figure 3:
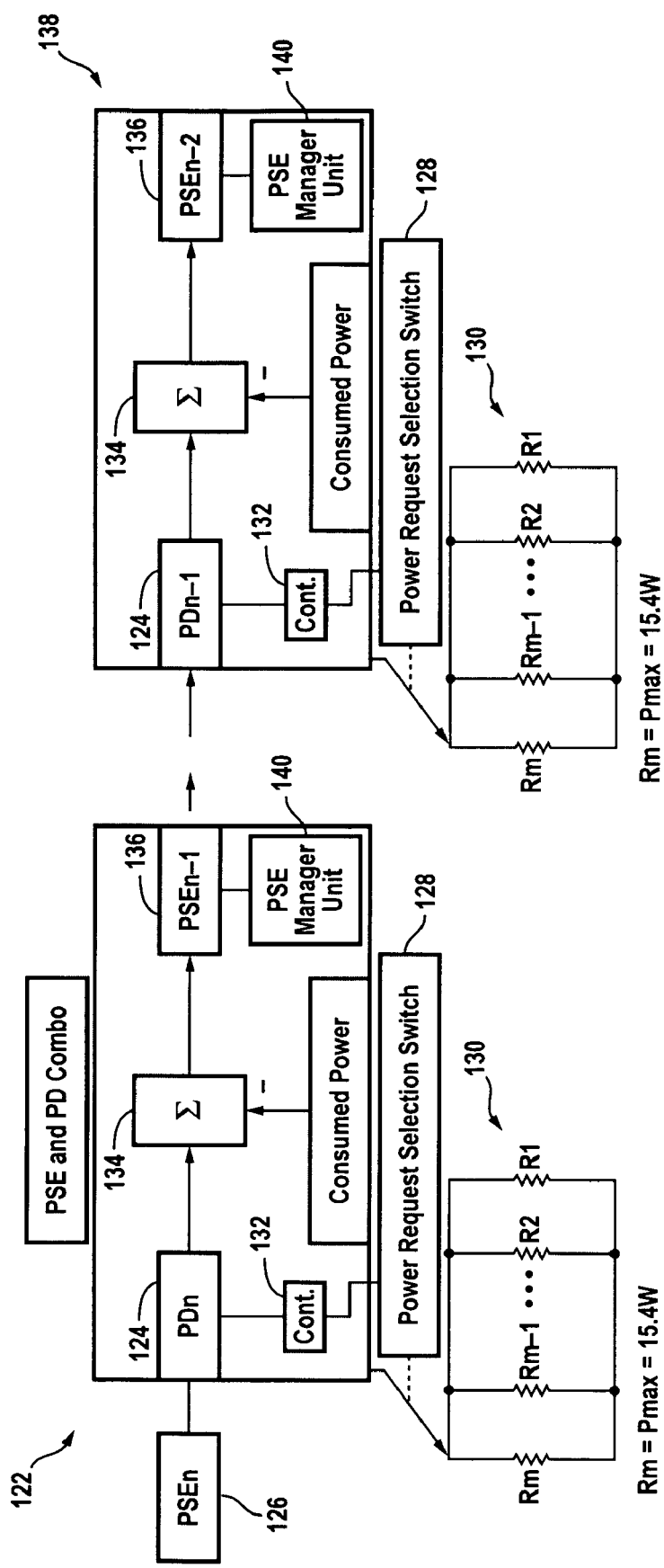
FIG. 3 is a system block diagram of a pair of PSE-PD combination units in accordance with an embodiment of the present invention.

Turning now to FIG. 3, the PSE-PD combination unit is now described in more detail. The PSE-PD combination device 122 requests the maximum power in the power classification stage when the unit is first coupled to a PSE such as PSE port 104. This is done by presenting a first identity network such as an electrical component or components across conductors coupling the PD component 124 to a PSE port 126 such as a port of an inline-powered Ethernet switch, or the like. Where the network in question is IEEE 802.3af compliant, a conventional IEEE 802.3af negotiation for inline power takes place with the PD component requesting maximum power from the coupled PSE port 126. If the PSE port 126 has the requested power available it will grant the request, otherwise it will reject the request. If the request is rejected, the PD component 124 does not give up, instead it requests the next lower amount of power by presenting a different identity network. In accordance with the IEEE 802.3af approach, the components are electrical resistors with certain resistance values corresponding to certain power classes as specified in the IEEE 802.3af standard. It should be noted, however, that this invention is intended to be applicable to the current IEEE 802.3af standard, subsequent versions of the standard and other similar approached for providing inline power over wired data telecommunications networks, whether IEEE 802.3af compliant or not.

When the PD 124 presents an identity network corresponding to a lower power request, the request will be either accepted or rejected by PSE port 126. If accepted, the power will be provided at the lower level, if rejected, the process will continue until power is provided or the PD runs out of classes to try. If the PD component 124 runs out of classes to try, never having received an acceptance of a power request, it will then give up and no inline power will be transferred from port 126 to PD component 124.

In accordance with an embodiment of the present invention, resistors are used as the identity network and a power request selection switch (PRSS) (which may be any form of suitable switching circuitry) 128 selects a suitable resistance from a power request resistor bank 130 to present to the coupled port 126 during the inline power negotiation phase. The PRSS 128 operates under the control of a controller circuit 132 (which may be implemented with an RC (resistor-capacitor) circuit, nonvolatile memory, CMOS (complementary metal oxide semiconductor) memory, or other suitable circuitry). The controller circuit 132 is coupled to PD component 124 so that it is aware of the state of negotiations for power.

Once a request for power is accepted, the entire PSE-PD combination unit powers up. Once powered up, the requested power value from the PSE 126 is presented to summation unit 134 (which, as discussed above, may be implemented with a microprocessor). From that power value is subtracted a measured or assumed value for the power consumed within the PSE-PD combination unit and, optionally, any measured or assumed power losses due to cabling. The summation unit calculates the remaining power value available and makes that value available to the PSE component 136 so that it may provide up to that value to a daisy chained PD unit such as second PSE-PD combination unit 138.

The number of devices in the chain is limited by the granularity of power sensing and power classes established (e.g., under IEEE 802.3af there are 4 classes: 0, 4, 7, 15.4 watts). It is anticipated that higher levels of power will eventually be made available under IEEE 802.3af and possibly finer granularity allowing more classes. With three levels of delivered power available, the present invention can be utilized to support a maximum of three devices each consuming four watts or less. By decreasing the granularity of the current sensing, more devices could be supported to share the total of 15.4 watts (potential more on future systems).

The PSE-PD combination unit can, for example, include circuitry to provide functionality such as an IP camera, a VOIP telephone, a sensor, and the like, with the power for these functions supplied as inline power and accounted for as consumed power as discussed above.

Three primary functional blocks of the PSE-PD combination unit are: (1) The PD component 124 which acts as a PD power request unit to request power from a coupled PSE based on predefined current limits drawn by the PD in the power classification stage. These current limits are represented by resistance values in one embodiment of the invention. By adjusting the PRSS 128 the power requested is changed (usually reduced after a rejection). Once a power request is accepted, the PRSS 128 stays in that state until a new power classification cycle is initiated (typically upon reboot of a switch or an interruption in connectivity to the PSE 126. The state of the PRSS 128 is representative of the power available to the PSE-PD combination unit 122 and a corresponding value is provided to the summation unit 134. (2) The summation unit 134 which sums power values from the PSE 126 with the power consumed (either measured or assumed). (3) The PSE Manager Unit 140 which grants (or rejects) PD power requests from PDs coupled to PSE port 136.

Figure 4:
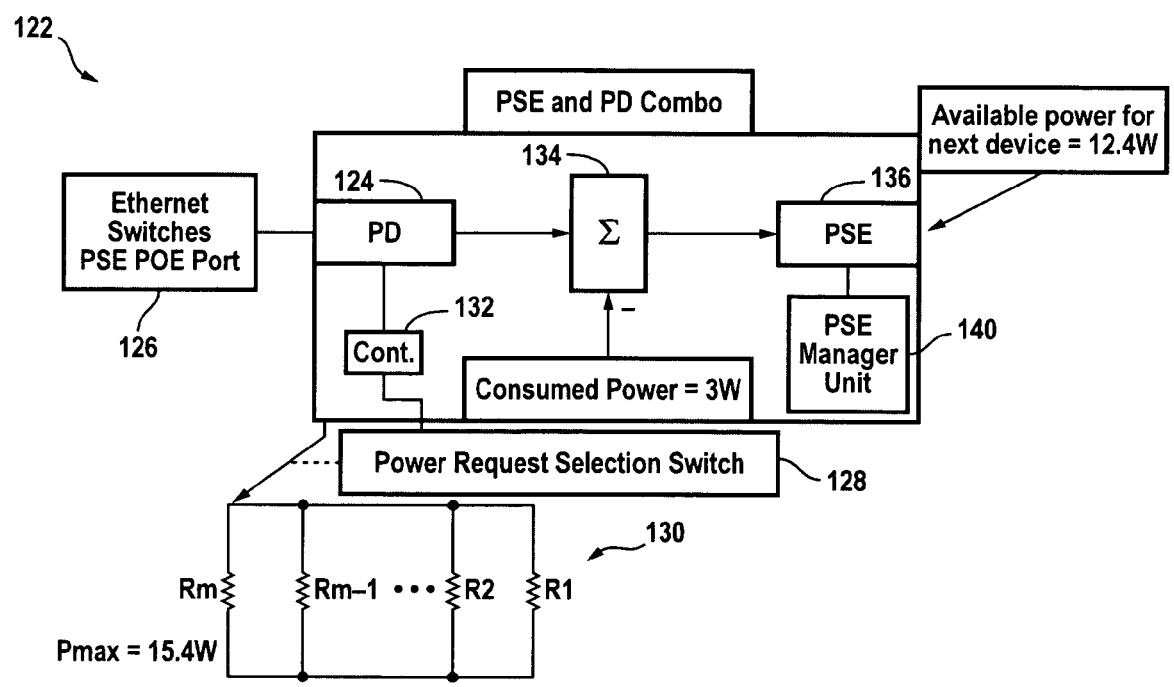
FIG. 4 is a system block diagram of a PSE-PD combination unit illustrating power utilization and availability in accordance with an embodiment of the present invention.

Turning now to FIG. 4 the PSE-PD combination unit 122 operates as follows. First, the PD component 124 of the PSE-PD combination unit 122 is connected to a port configured as PSE such as port 126. The PRSS 128 is set to (by default) to request maximum power under the inline power scheme in effect. The port 126 and the PD component 124 engage in an inline power negotiation phase as discussed above and some level of power is provided to the PD component 124 (if no power is provided, the process stops). The PSE-PD combination unit 122 powers up as inline power becomes available and calculates the amount of power available to the next device with the summation unit 134. The summation unit 134 makes its information available to the PSE Manager Unit 140. (Note that the controller 132, PSE Manager Unit 140 and Summation Unit 134 could all be implemented as one microprocessor or fixed logic circuitry, if desired).

Figure 5:
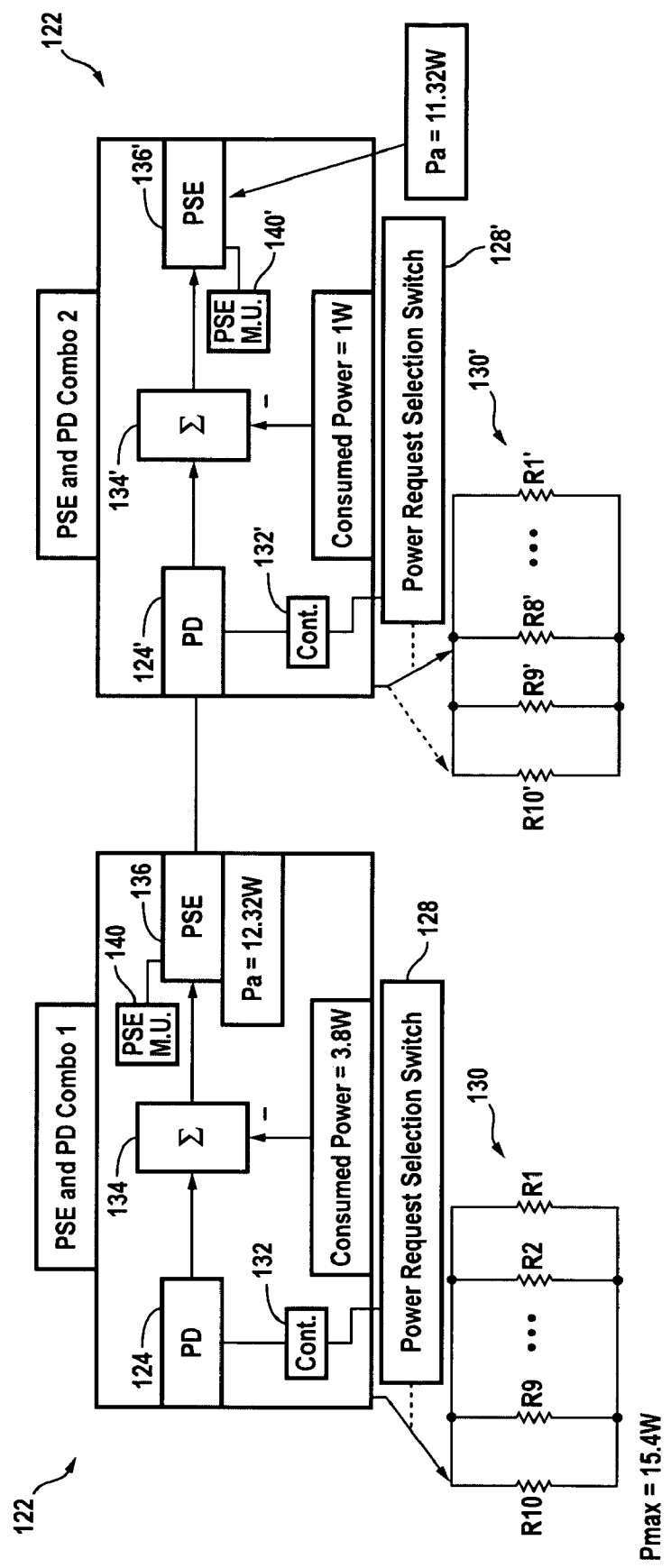
FIG. 5 is a system block diagram of a pair of PSE-PD combination units coupled in a daisy chain configuration in accordance with an embodiment of the present invention.

Turning now to FIG. 5, the operation continues as a second PSE-PD Combination Unit 122' has its PD component 124' coupled to the PSE component 136 of first combination unit 122. As shown in FIG. 5, there are ten total resistors in each power request resistor bank 130, 130' illustrated in FIG. 5 (this differs from the implementation illustrated in FIGS. 3 and 4 where there are "m" resistors in each bank). Resistor value is set in such a way that requested power is reduced (in this embodiment) by one-tenth of the maximum power of 15.4 watts. PRSS 128 on PSE-PD combination unit 122' is set by default to select resistor R10 when PSE-PD combination unit 122' is plugged into PSE-PD combination unit 122. It therefore requests a maximum power from PSE-PD combination unit 122 of 15.4 watts (which is not available due to circuitry power losses and use in PSE-PD combination unit 122). Accordingly, the request fails. Thereafter the second PSE-PD combination unit 122' reconfigures PRSS 128 to select a resistor corresponding to a power request of 90% of the previous request (i.e., 13.86 watts). It fails again. The PRSS is set to R8 whereupon the power request is accepted and 11.32 watts of inline power are provided from first PSE-PD combination unit 122 to second PSE-PD combination unit 122'.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. An inline power device, comprising:
    a first port configured as a powered device (PD) port for coupling power and data with a port of an external power sourcing equipment (PSE), the first port facilitating a power negotiation with the port of the external PSE;
    a plurality of selectable electrical components for use in establishing a magnitude of a power request from the external PSE, said selectable electrical components being selected as a function of said power negotiation;
    a summation unit configured to:
    receive a power level from the PSE via the first port in response to the power negotiation with the external PSE, the power level representing a total amount of power provided to the inline power device by the PSE,
    detect a power consumption level associated with the inline power device, the power consumption level associated with an amount of power utilized by the inline power device during operation, and
    detect an available power level for use by a downstream coupled PD based upon a difference between the power level and the power consumption level;

a second port configured as a PSE port for coupling available power and data with a port of a downstream coupled PD; and a PSE manager unit configured for receiving inline power requests from a downstream coupled PD and responsive to the summation unit for providing up to the available power level to the downstream coupled PD.

2. The device of claim 1, wherein the plurality of selectable electrical components are a plurality of selectable resistors.

3. The device of claim 1 wherein said first port and said second port are Ethernet ports.

4. The device of claim 2 wherein said first port and said second port are Ethernet ports.

5. The device of claim 1, further comprising:
circuitry for selecting one of the plurality of selectable electrical components, wherein said circuitry is configured to first select a component corresponding to a request for a maximum amount of power.

6. The device of claim 5, wherein said circuitry is configured to second select a component corresponding to a request for a less than maximum amount of power upon denial of the first request.

7. The device of claim 6, wherein the plurality of selectable electrical components are a plurality of selectable resistors.

8. The device of claim 7 wherein said first port and said second port are Ethernet ports.

9. A method for providing inline power, comprising:
coupling a first port configured as a powered device (PD) port of a powered device-power sourcing equipment (PD-PSE) combination device to a PSE-configured port of a first external device;

coupling a second port configured as a PSE port of the PD-PSE combination device to a PD-configured port of a second external device;

selectively requesting, by way of a negotiation through the PD port and beginning with a maximum value, power at the first port from the first external device;

receiving a negotiated power level from the first external device via the first port in response to the power negotiation with the first external device, the negotiated power level representing a total amount of power provided by the first external device;

detecting a power consumption level associated with the PD-PSE combination device, the power consumption level associated with an amount of power utilized by the PD-PSE combination device during operation;

detecting an available power level for use by the downstream coupled second external based upon a difference between the negotiated power level and the power consumption level;

consuming power up to the power consumption level, by the PD-PSE combination device, provided by the first external device; and providing available power up to the available power level, received from the first external device by the PD-PSE combination device, to the second external device.

10. The method of claim 9, further comprising:
receiving a request for inline power from a downstream-coupled PD at the second port; and
accepting the request for inline power from the downstream-coupled PD if the request is for an amount of power not exceeding the power available.

11. The method of claim 9, further comprising:
receiving a request for inline power from a downstream-coupled PD at the second port; and denying the request for inline power from the downstream-coupled PD if the request is for an amount of power exceeding the power available.

12. The method of claim 9, further comprising:
receiving a request for inline power from a downstream-coupled PD at the second port;
accepting the request for inline power from the downstream-coupled PD if the request is for an amount of power not exceeding the power available; and
denying the request for inline power from the downstream-coupled PD if the request is for an amount of power exceeding the power available.

13. The method of claim 12, further comprising:
requesting subsequently, responsive to a denial of the initial request, a less than maximum available power at the first port from the first external device.

14. An apparatus for providing inline power, comprising:
means for coupling a first port configured as a powered device (PD) port of a powered device-power sourcing equipment (PD-PSE) combination device to a PSE-configured port of a first external device;

means for coupling a second port configured as a PSE port of the PD-PSE combination device to a PD-configured port of a second external device;

means for selectively requesting, by way of a negotiation through the PD port and beginning with a maximum value, power at the first port from the first external device;

means for receiving a negotiated power level from the first external device via the first port in response to the power negotiation with the first external device, the negotiated power level representing a total amount of power provided by the first external device;

means for detecting a power consumption level associated with the PD-PSE combination device, the power consumption level associated with an amount of power utilized by the PD-PSE combination device during operation;

means for detecting an available power level for use by the downstream coupled second external based upon a difference between the negotiated power level and the power consumption level;

means for consuming power up to the power consumption level, by the PD-PSE combination device, provided by the first external device; and means for providing available power up to the available power level, received from the first external device by the PD-PSE combination device, to the second external device.

15. The device of claim 1, wherein the PSE manager unit is configured to provide up to the available power level to a set of downstream daisy chained PD.

16. The method of claim 9, wherein providing available power up to the available power level, received from the first external device by the PD-PSE combination device, to the second external device comprises providing available power up to the available power level, received from the first external device by the PD-PSE combination device, to a set of downstream daisy chained second external devices.

17. The apparatus of claim 14, wherein means for providing available power up to the available power level, received from the first external device by the PD-PSE combination device, to the second external device comprises means for providing available power up to the available power level, received from the first external device by the PD-PSE combination device, to a set of downstream daisy chained second external devices.

18. The device of claim 1, wherein the inline power device is configured to consume power up to the power consumption level provided to the inline power device by the external PSE.

19. The device of claim 1, wherein:
when facilitating a power negotiation with the port of the external PSE, the first port is configured to present the plurality of selectable electrical components to the external PSE, the inline power device configured as an IEEE 802.3af standard compliant device and the external PSE configured as an IEEE 802.3af standard compliant device; and
the second port, configured as a PSE port, is configured to receive a downstream power negotiation request from the downstream coupled PD and is configured to provide an available amount of power, based upon the downstream power negotiation request, and data to the downstream coupled PD, the downstream coupled PD configured as an IEEE 802.3af standard compliant device.

20. The device of claim 19, further comprising:
a PD component disposed in electrical communication with the first port, the PD component configured to negotiate power with the external PSE via the first port, based upon the plurality of selectable electrical components; and
wherein the PSE manager unit is disposed in electrical communication with the second port, the PSE manager unit, when receiving inline power requests from a downstream coupled PD, is configured to receive downstream a power negotiation request from the downstream coupled PD via the second port, the PSE manager unit configured to one of grant the downstream power negotiation request from the downstream coupled PD up to the available power level or reject the downstream power negotiation request based upon the available power level for use by the downstream coupled PD as detected by the summation unit.

* * * * *

UNITED STATES PATENT AND TRADEMARK OFFICE
CERTIFICATE OF CORRECTION

PATENT NO.      : 7,664,136 B2                    Page 1 of 1
APPLICATION NO. : 11/144094
DATED           : February 16, 2010
INVENTOR(S)     : Toebes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Twenty-eighth Day of December, 2010

David J. Kappos
*Director of the United States Patent and Trademark Office*